Aug. 25, 1931.  W. E. HANN  1,820,616
LUBRICATING MEANS
Filed June 17, 1929
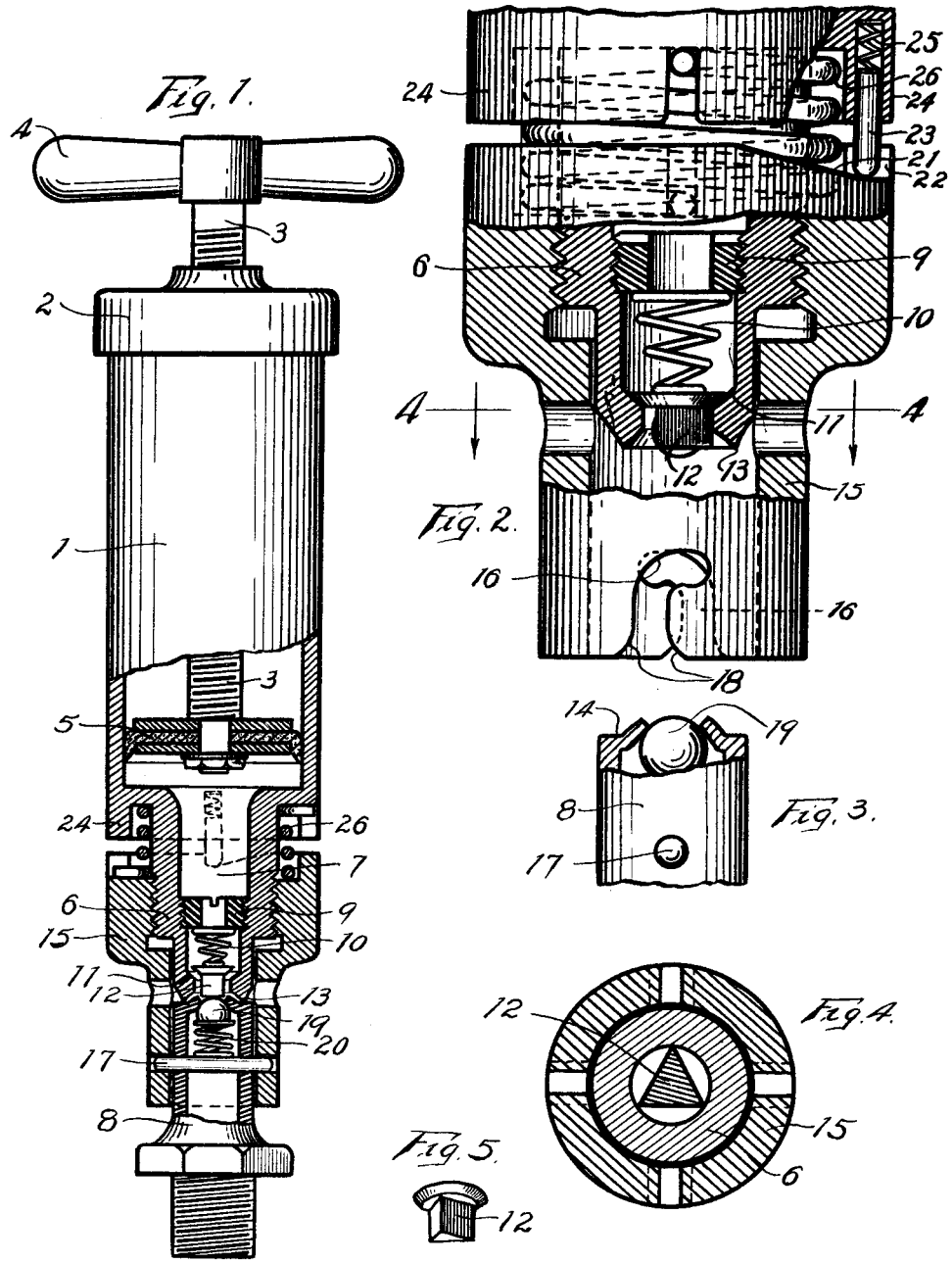
INVENTOR
William E. Hann,
Witness:

Patented Aug. 25, 1931

1,820,616

UNITED STATES PATENT OFFICE

WILLIAM E. HANN, OF DETROIT, MICHIGAN, ASSIGNOR, BY MESNE ASSIGNMENTS, TO THE LUBRICATING EQUIPMENT COMPANY, OF DETROIT, MICHIGAN, A CORPORATION OF MICHIGAN

LUBRICATING MEANS

Application filed June 17, 1929. Serial No. 371,474.

This invention relates to high pressure lubricating apparatus particularly adaptable for use in lubricating the chassis of automobiles and the like.

The main objects of this invention are to provide an improved metal to metal sealed joint between the lubricant reservoir and nipple, to provide a simple construction of coupling which will have a long and satisfactory life; to provide an improved construction in which the sealed joint will be free from perishable gaskets; and to provide a generally improved and simplified construction of lubricating means.

Heretofore grease guns of this general type have had gaskets of leather and the like in the coupling nozzle. Due to the extremely high pressures to which they are sometimes subjected, these gaskets soon wear out and have to be replaced. My improved construction overcomes these objections, and the device will therefore, have a longer and more satisfactory period of use.

An illustrative embodiment of this invention is shown in the accompanying drawings, in which:—

Fig. 1 is a view, partly in elevation and partly in section, of a grease gun or compressor coupled to a pin fitting or nipple.

Fig. 2 is an enlarged fragmentary view, partly in section, of the improved coupling nozzle.

Fig. 3 is an enlarged fragmentary view, partly in section, of the top end of the pin fitting.

Fig. 4 is a sectional view taken on the line 4—4 of Fig. 2.

Fig. 5 is an enlarged view, in perspective, of the valve in the end of the discharge nozzle.

In the construction shown in the drawings an elongated tubular lubricant reservoir 1 has a cap 2 threaded or otherwise detachably secured thereon, through which is threaded a piston rod 3. The end of the piston rod 3 which projects without the cap is provided with a handle 4 which can be conveniently grasped by the hand of the user for rotating the piston rod, which rod is threaded in a right hand direction. The opposite or inner end of the piston rod carries a piston 5 rotatably mounted thereon for forcing lubricant out of the reservoir 1 under pressure.

The end of the reservoir, opposite to the cap 2, is provided with a discharge nozzle 6 which has an axial bore 7 therethrough for conducting lubricant from the reservoir to the lubricant receiving member, 8, which in this instance is shown as a nipple of the pin fitting type.

Midway of the nozzle, the bore 7 is reduced in diameter, and is interiorly threaded to receive an exteriorly threaded sleeve 9 against which abuts one end of a compression spring 10. The extreme lower end of the bore 7 is again reduced to provide a valve seat 11 for cooperating with an outwardly closing valve 12, which is normally urged to a closed position on its seat by the compression spring 10.

The lower end of the nozzle 6 terminates in a sharp annular dirt cutting rim 13 which is preferably of harder metal than the material from which the nipples are formed, but not necessarily so. This rim 13 is adapted to fit against the face 14 of the nipple 8 and make a metal to metal sealed joint therebetween.

Means are provided for securing a firm leak proof coupling between the nozzle and nipple and comprises a sleeve 15 interiorly threaded at its upper end on exterior threads cut on the nozzle 6. These threads are also right handed, so that relative rotation between the sleeve and nozzle caused by right handed turning of the handle 4, draws the sleeve upwardly on the nozzle. The lower end of the sleeve 15 is provided with bayonet slots 16 located at diametrically opposite sides so as to receive the pin 17 of the nipple 8. The outer ends of the slots 16 are flared outwardly as shown at 18 for facilitating the slipping of the sleeve, in telescoped relation, on the nipple 8.

The nipple 8 is of the well known construction in which a ball valve 19 is normally held closed on its seat by a helical compression spring 20 which is held in place by the pin 17. The upper face of the sleeve 15 is cut away to provide an inclined portion 21 and an abrupt shoulder 22 which cooperates with an axially slidable pin 23 mounted in the lower face of a depending annular rim 24 integrally formed on the nozzle 6. The pin 23 is yieldingly urged downwardly by a compression spring 25 so that the lower end thereof rides on the face of sleeve and limits left hand rotation thereof relative to the nozzle by abutting against the shoulder 22.

A helical torsion spring 26 has one end thereof anchored to the nozzle 6 and the other end thereof anchored to the sleeve 15 for rotating the parts relatively to each other in a left hand direction, so as to insure sufficient space between the sealing rim 13 and the face 14 of the nipple 8 to permit ready coupling of the sleeve to the nipple.

In the operation of this lubricating means the cap 2 is removed and the reservoir 1 is filled with lubricant in the usual manner. Bearings to be lubricated are each provided with one of the nipples 8, if not all ready so equipped.

The grease gun is placed in substantially axial alinement with the nipple and then shifted axially so that the outer end of the sleeve 15 telescopes over the nipple 8 with the pin 17 entering the bayonet slot 16, the flaring ends 18 thereof, aiding in this operation.

The handle 4 is then grasped and turned to the right thereby rotating the reservoir 1 and sleeve 15 to the right so as to engage the pin 17 in the bayonet slot 16 thus effecting a quickly detachable swivel connection between the sleeve and nipple.

Continued rotation in the same direction, rotates the nozzle 6 relatively to the sleeve 15, thereby causing axial movement of the nozzle toward the nipple by reason of the right handed threaded connection between the nozzle and sleeve.

This axial movement will bring the dirt cutting rim 13 against the face 14 of the nipple and effect a sealed lubricant conducting connection between the nozzle and nipple. As the rim 13 moves into contact with the nipple the stem of the valve 12 engages the end of the nipple and the valve is moved upwardly off its seat 11, thereby opening communication to the reservoir.

Further rotation of the handle 4 causes the threaded piston rod 3 to move inwardly through the cap 2 and carry the piston 5 downwardly to expel lubricant from the reservoir.

The greater the resistance that is met by the lubricant entering the nipple, the tighter the metal to metal sealed joint will be made due to the threaded connection between the nozzle and sleeved connection between the During the relative rotation between the nozzle and sleeve, the torsion spring 26 has been wound up, and when the handle 24 and gun have turned in a left hand direction for disconnecting the swivel bayonet slot connection, the spring will automatically rotate the sleeve until the pin 23 strikes the shoulder 22. This places the device in proper condition to be attached to another nipple and also permits the valve 12 to close by reason of the clearance thus secured.

In the construction illustrated a bayonet slot connection to a pin fitting has been illustrated, but any type of nipple and connection will suffice, such as the improved type of quick detachable swivel connection shown and described in the Remi J. Gits Patent Number 1,676,086 issued July 3, 1928, upon which this present invention is an improvement.

Although but one specific embodiment of this invention has been herein shown and described, it will be understood that numerous details of the construction shown may be altered or omitted without departing from the spirit of this invention as defined by the following claims.

I claim,—

1. In a lubricating apparatus of the character described, connecting means comprising a lubricant ejection nozzle communicating with a source of lubricant under pressure, said nozzle terminating in an annular dirt cutting rim, a lubricant receiver affixable to the object of lubrication, and a coupling connecting said nozzle and receiver, said receiver and coupling having endwise interfitting and limited turning swivel connection, and said coupling and nozzle having threaded connection for moving said nozzle relatively to said receiver when rotated relatively thereto, the threaded and swivel connections being closed by the same direction of torque.

2. In a lubricating apparatus of the character described, the combination of a discharge nozzle communicating with a source of lubricant under pressure, said nozzle terminating in a metallic dirt cutting sealing face, a coupling member threaded on said nozzle, a lubricant receiving member adapted to receive and contact said sealing face, one of said members being adapted to slidably embrace the other when shifted axially relatively thereto, a coacting swivel connection between said members for detachably interlocking them together when rotated relatively to each other, a connection between said nozzle and sleeve whereby continued rotation of said nozzle in the same direction relatively to said members will cause said nozzle to effect a sealed lubricant conducting connection with said lubricant receiving member.

3. In a lubricating device of the character described, a lubricant receiver of the nipple having a abutment thereon, a nipple engaging sleeve having a stop thereon engaging the abutment on the nipple when turning the sleeve to a limited degree to hold the sleeve stationary, a detachable swivel connection to positively lock the sleeve and nipple together, a nozzle communicating with a source of lubricant under pressure engaging said sleeve for axial movement therethrough and into engagement with the nipple to effect a sealed communication therebetween, said nozzle terminating in a metallic sealing face for contacting with said nipple, the said nozzle moving into engagement with the nipple after the sleeve has reached its limit of movement, the locking of the sleeve to the nipple and the establishing of a seal between the nozzle and nipple being effected by rotation of the nozzle in one direction relative to the nipple.

4. A device as described in claim 1 which is characterized by having an outwardly closing valve in the discharge passageway of the nozzle, said valve being opened by contact with the lubricant receiver when coupled therewith in sealed relation.

WILLIAM E. HANN.